United States Patent
Obendiek et al.

(10) Patent No.: US 7,364,217 B2
(45) Date of Patent: Apr. 29, 2008

(54) TOP FOR A CONVERTIBLE VEHICLE

(75) Inventors: Klaus Obendiek, Passau (DE);
Heinrich Wuellrich, Plattling (DE)

(73) Assignee: Edscha Cabrio-Dachsysteme GmbH, Hengersberg (DE)

( * ) Notice: Subject to any disclaimer, the term of this patent is extended or adjusted under 35 U.S.C. 154(b) by 0 days.

(21) Appl. No.: 10/663,333

(22) Filed: Sep. 16, 2003

(65) Prior Publication Data
US 2004/0108748 A1 Jun. 10, 2004

(30) Foreign Application Priority Data
Sep. 16, 2002 (DE) .............................. 102 43 085
Jan. 8, 2003 (DE) .......................... 203 00 133 U
Apr. 11, 2003 (WO) ..................... PCT/DE03/01214
Apr. 11, 2003 (WO) ..................... PCT/DE03/01215

(51) Int. Cl.
*B60J 7/14* (2006.01)

(52) U.S. Cl. .................... 296/108; 296/107.17
(58) Field of Classification Search ............... 296/108, 296/107.17, 107.07, 107.08
See application file for complete search history.

(56) References Cited

U.S. PATENT DOCUMENTS

| | | | | |
|---|---|---|---|---|
| 5,769,483 A | 6/1998 | Danzl et al. | ................ | 296/107 |
| 6,336,673 B1 | 1/2002 | Rothe et al. | ........... | 296/107.17 |
| 6,419,296 B2 | 7/2002 | Dintner et al. | ........ | 296/107.18 |
| 6,425,620 B1 | 7/2002 | Schutt et al. | ......... | 296/107.07 |
| 6,425,621 B2 | 7/2002 | Miklosi et al. | ............ | 296/108 |
| 6,502,892 B2 | 1/2003 | Eberle | ........................ | 296/108 |
| 6,511,118 B2 | 1/2003 | Liedmeyer et al. | .... | 296/107.17 |
| 6,767,045 B2* | 7/2004 | Reinsch | ................ | 296/107.17 |
| 6,786,528 B2 | 9/2004 | Guillez et al. | ............. | 296/108 |
| 6,799,789 B2 | 10/2004 | Guillez et al. | ............. | 296/121 |
| 6,830,283 B2 | 12/2004 | Guillez et al. | ............. | 296/108 |
| 2001/0019213 A1 | 9/2001 | Eberle | ........................ | 296/108 |
| 2001/0040385 A1 | 11/2001 | Obendiek | ................... | 296/108 |
| 2003/0080579 A1* | 5/2003 | Reinsch | ................ | 296/107.17 |
| 2004/0195859 A1* | 10/2004 | Bruder | ....................... | 296/108 |

FOREIGN PATENT DOCUMENTS

| | | |
|---|---|---|
| DE | 43 16 485 | 11/1994 |
| DE | 44 35 222 | 11/1995 |
| DE | 196 42 152 | 4/1998 |
| DE | 196 42 153 | 4/1998 |
| DE | 198 05 477 | 8/1999 |
| DE | 198 46 006 | 4/2000 |
| DE | 199 34 673 | 1/2001 |
| DE | 199 32 503 | 2/2001 |
| DE | 199 57 427 | 3/2001 |
| DE | 100 06 290 | 5/2001 |

(Continued)

*Primary Examiner*—Jason S Morrow
(74) *Attorney, Agent, or Firm*—Davidson, Davidson & Kappel, LLC

(57) ABSTRACT

A convertible vehicle top includes a first roof part, a second roof part adjoining the first roof part in a closed position of the top, and an outer link pivotably connected to the first roof part and to the second roof part. The outer link is connected to the first roof part by a first link mechanism and is disposed on an outer side of the first roof part in the closed position of the top.

32 Claims, 21 Drawing Sheets

FOREIGN PATENT DOCUMENTS

| | | |
|---|---|---|
| DE | 199 64 029 | 5/2001 |
| DE | 101 08 493 | 9/2001 |
| DE | 100 39 680 | 3/2002 |
| DE | 100 39 683 | 3/2002 |
| DE | 101 19 069 | 10/2002 |
| FR | 2819757 | 7/2002 |
| FR | 2820692 | 8/2002 |
| WO | 02/49864 | 7/2002 |

* cited by examiner

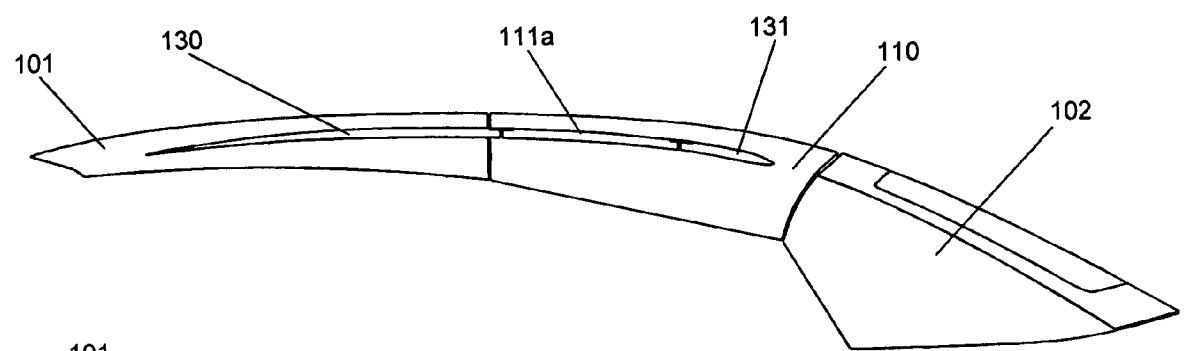
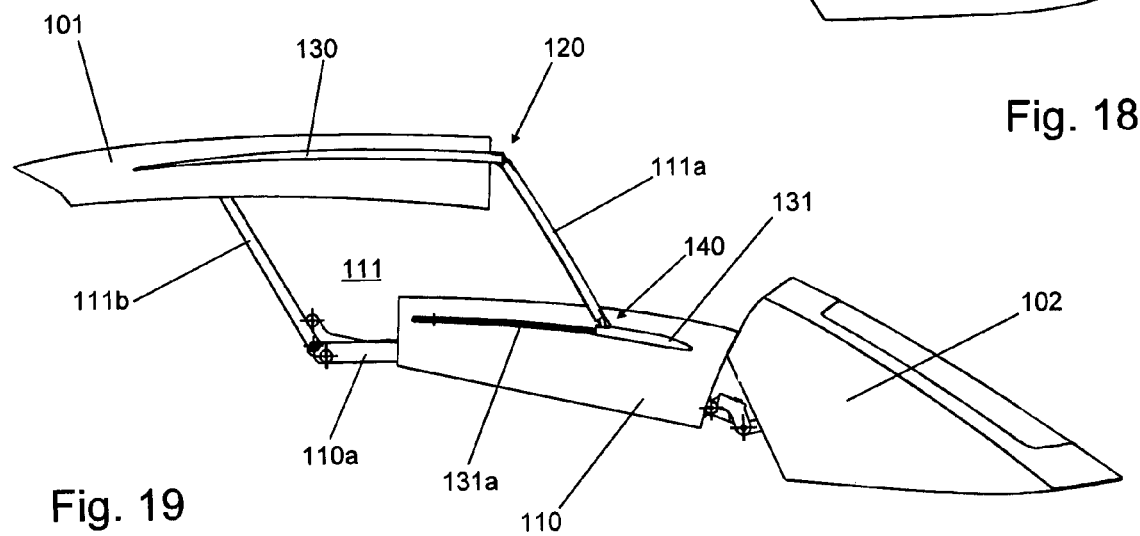

TOP FOR A CONVERTIBLE VEHICLE

Priority is claimed to the following applications: German Patent Application DE 102 43 085.3, filed on Sep. 16, 2002; German Utility Model DE 203 00 133.8, filed on Jan. 8, 2003; International Patent Application PCT/DE03/01215, filed on Apr. 11, 2003; and International Patent Application PCT/DE03/01214, filed on Apr. 11, 2003. The entire disclosure of each of the aforesaid documents is hereby incorporated by reference herein.

BACKGROUND

The present invention relates to vehicles in general and in particular to convertible tops for vehicles.

In the construction of modern convertible tops which comprise a plurality of hard roof parts and can be deposited automatically in a rear region of the vehicle, the problems generally concern rigid parts which are movable with respect to one another in a manner taking up space.

From the practical experience of constructing convertible vehicles, solutions are known in which a recessed, outer link can be covered by means of a strip-shaped flap which is attached pivotably to a roof part and forms a covering for a roof drip molding.

SUMMARY OF THE INVENTION

It is an object of the present invention to provide a top for a convertible vehicle in which an outer roof link is formed in an advantageous manner.

It is a further and/or alternate object of the present invention to provide a convertible top which has an improved appearance.

It is another further and/or alternate object of the present invention to provide a convertible hard top which is easily retractable.

It is yet another further and/or alternate object of the present invention to provide a convertible top with a suitable opening and closing movement.

The present invention provides a convertible vehicle top that includes a first roof part, a second roof part adjoining the first roof part in a closed position of the top, and an outer link pivotably connected to the first roof part and to the second roof part, wherein the outer link, in the closed position of the top, is disposed on an outer side of the first roof part, and wherein the outer link is connected to the first roof part by a first link mechanism.

The present invention also provides a convertible vehicle top that includes a first roof part, a second roof part adjoining the first roof part in a closed position of the top, and a link pivotably connected to the first roof part and to the second roof part, wherein the link is connected to the second roof part by an upper link mechanism.

In addition, the present invention provides a convertible vehicle top that includes a first roof part, a second roof part adjoining the first roof part in a closed position of the top; and an outer link pivotably connected to the first roof part and to the second roof part wherein said outer link is arranged on an outer side of at least one of said first roof part and said second roof part by a link mechanism; and wherein a covering member is arranged on said at least one of said first roof part and said second roof part for at least partially resting over said link mechanism when said top is in a closed position.

The articulation according to the present invention of the outer link by means of the link mechanism has the advantageous effect of making possible a particularly large pivoting angle. A particularly large pivoting angle of virtually 180 degrees is advantageously made possible in this manner.

The link mechanism is preferably designed as a four-bar linkage, the first roof part forming a base of the four-bar linkage and the outer link forming a connecting member of the four-bar linkage. A small-sized and stable link mechanism can thereby be realized in a simple manner.

The outer link is particularly preferably held on the second roof part by means of a second link mechanism. This makes possible an advantageous pivoting of the link over a large angular region. The second link mechanism is particularly preferably likewise designed as a four-bar linkage in this case.

In a preferred embodiment of a top according to the present invention, the outer link is arranged in a groove-like recess of the first roof part in a closed state of the top. The effect, which can advantageously be achieved in this manner, is that the outer link cannot be seen from the outside in the closed state of the top.

In this case, a covering plate is preferably fixed in a pivotable manner in a joint, so that the covering plate can be pivoted essentially parallel to links of the link mechanism. By this means, a visual covering of the link in the form of a conventional roof drip molding can be achieved in a simple manner in the closed state of the top.

In a further preferred embodiment of a top according to the present invention, the outer link is designed as part of a longitudinal body, which protrudes over an outer surface of the top in the closed state of the top. In particular, the outer link can rest on the outer surface of the top in the manner of a trim strip. This enables the outer link to advantageously be used simultaneously as a functional and also as a creative element of the top.

In this case, at least one of the two roof parts is particularly preferably designed as a single-piece shaped part. This makes it possible to produce the roof parts in a simpler and more cost-effective manner. Particularly if the provision of a groove-like recess for holding the outer link in the closed state of the top is essentially omitted, not only is the production of the roof parts simpler and more cost-effective, but also the sealing in the region between the first and second roof part is simplified. This avoids, in particular, the complicated production of the roof parts from a plurality of shaped parts, which are welded to one another in the region of the groove-like recess.

One connecting link of the link mechanism is particularly advantageously a formative component of the longitudinal body in the closed state of the top. By this means, creative and functional elements and a simple manner of construction are combined to a particular extent.

In general, provision can preferably be made in the case of a top according to the present invention for the second roof part to be pivotable essentially parallel over the first roof part. This makes it possible to achieve a favorable packing size of the deposited roof parts in the open state of the top.

In particular, provision is preferably made in the case of a top according to the present invention for the outer link to be pivotable through an angle of at least 150 degrees, particularly preferably through at least 160 degrees.

In a particularly preferred refinement of a top according to the present invention, the first roof part is a middle roof part and the second roof part is a front roof part of a three-part top, a third roof part being arranged behind the first roof part in the direction of travel. In this case, during an opening movement of the top, the second roof part can preferably be moved over the first roof part, and the third roof part can preferably be moved over the first roof part and over the second roof part. This enables a particularly large top to be realized for use in four- and multi-seater vehicles, which nevertheless takes up a particularly small packing size in the open state of the top.

Further advantages and features of a top according to the present invention are revealed in the exemplary embodiments described below and in the dependent claims.

BRIEF DESCRIPTION OF THE DRAWINGS

Two preferred exemplary embodiments of a top according to the present invention will be described below and explained in greater detail with reference to the drawings, in which:

FIG. 18 shows a schematic side view of a second exemplary embodiment of a top according to the present invention;

FIG. 19 shows the top from FIG. 18 in a partially open state;

DETAILED DESCRIPTION OF PREFERRED EMBODIMENTS

Figure 1:
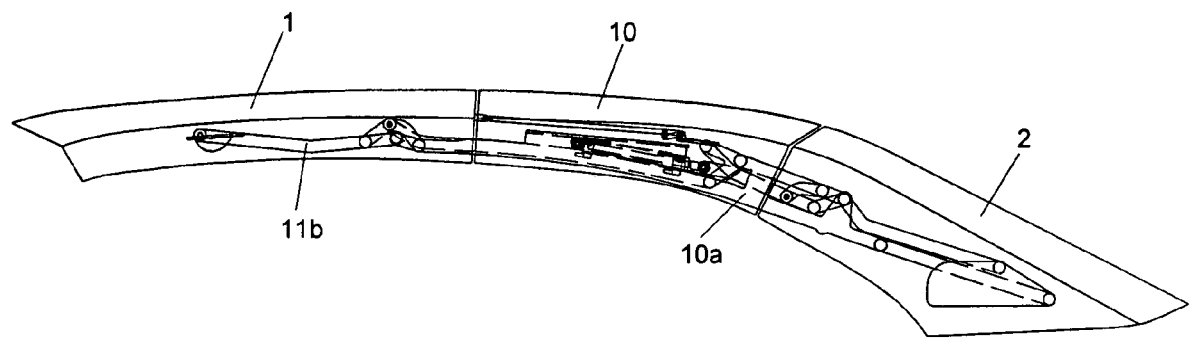
FIG. 1 shows a schematic partial view of a first exemplary embodiment of a top according to the present invention from the side in a closed position of the top.

The first preferred exemplary embodiment of a top according to the present invention comprises a front roof part 1, a rear roof part 2 and a middle roof part 10, which is arranged between the front and the rear roof parts 1, 2 in the closed state. The middle roof part 10 is connected fixedly to a middle link 10a, and so the middle roof part 10 and the middle link 10a can be regarded as a constructional unit.

The front roof part 1 is connected to the middle roof part 10 via a front four-bar linkage 11, a front link 11b of the front four-bar linkage being connected in an articulated manner to the middle link 10a and an outer link 11a of the front four-bar linkage 11 being articulated from the outside on the middle roof part 10. In the closed state according to FIG. 1, FIG. 2 and FIG. 11, the outer link bears against the outside of the middle roof part 10, the outer link being situated in a recess of a roof drip molding or roof channel of the middle roof part 10.

The rear roof part 2 is articulated on the middle link 10a by means of a rear four-bar linkage 12. The rear roof part 2 comprises C-pillars of the top and a fixed rear window. The rear four-bar linkage 12 comprises a first rear link 12a and a second rear link 12b.

Overall, the front roof part 1 and the rear roof part 2 can therefore be pivoted in each case over the middle roof part 10, it also being possible for the rear roof part 2 to be pivoted over the front roof part 1.

The front four-bar linkage 11 and the rear four-bar linkage 12 are connected to each other via a drivable positive control means 4, with the result that a position of the front roof part 1 is unambiguously assigned mechanically in each case to a position of the rear roof part 2.

The positive control means 4 comprises a first linkage 8 which activates the front four-bar linkage 11, a second linkage 9 which activates the rear four-bar linkage 12, and a rotary link 7. The rotary link is connected rotatably to the middle link 10a in a first joint 7a. The rotary link 7 can also be rotated in a drivable manner by means of a force-introducing unit 5, which is designed as a linear hydraulic cylinder and is supported against the middle link 10a. In the present case, the rotary link is designed as a three-armed link. However, within the context of the present invention, a rotary link may, in particular, also be understood as meaning a rotary disk or control disk. A universally usable perforated disk may, in particular, also be used as the control disk, with the result that the provision of joints in a variable manner on the perforated disk enables a deceleration control means, which can be adapted to different tops to be provided by means of standardized components.

The first linkage 8 comprises a first, front control link 8a and two front links 8b, 8c, in which case, by connecting the front link 11b to the first control link 8a by means of the two front links 8*b*, 8*c*, a particularly large pivoting angle of the front four-bar linkage 11 can be achieved. The first control link 8*a* is connected to the rotary link 7 in a second joint 7*b* of the rotary link 7.

The second linkage 9 comprises a second, rear control link 9*a*, which is guided with respect to the middle link 10*a* via a small supporting link 9*b*. The second control link 9*a* is articulated on an extension of the second rear link 12*b*, thus enabling the rear four-bar linkage 12 to be articulated on the second control link 9*a* and to be activatable via the latter.

The middle roof part 10 or the middle link 10*a* is connected to a main bearing unit 14, which is attached in a manner secured on the bodywork, via a main four-bar linkage 13, the main four-bar linkage 13 comprising a first main link 13*a* and a second main link 13*b*.

A storage region 16 at the rear of the vehicle can be covered by means of a rear element 15, it being possible for the rear element 15 to be pivoted up counter to the direction of travel in order to open up a space for the top, which is to be deposited to pass through.

Figure 15:
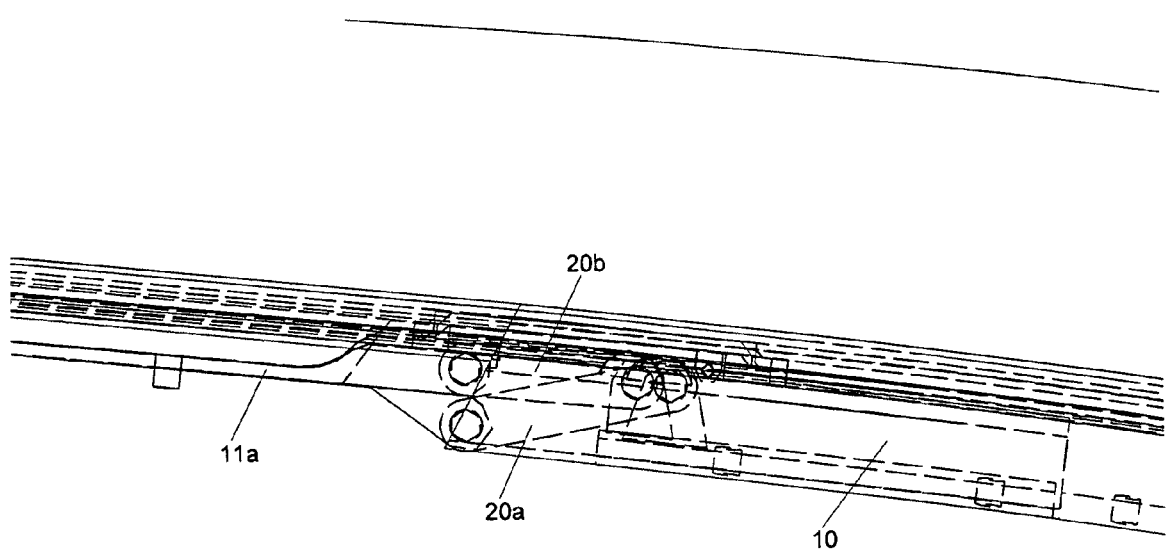
FIG. 15 shows a detail view of an outer link of the top from FIG. 1 in a closed position of the top.
Figure 16:
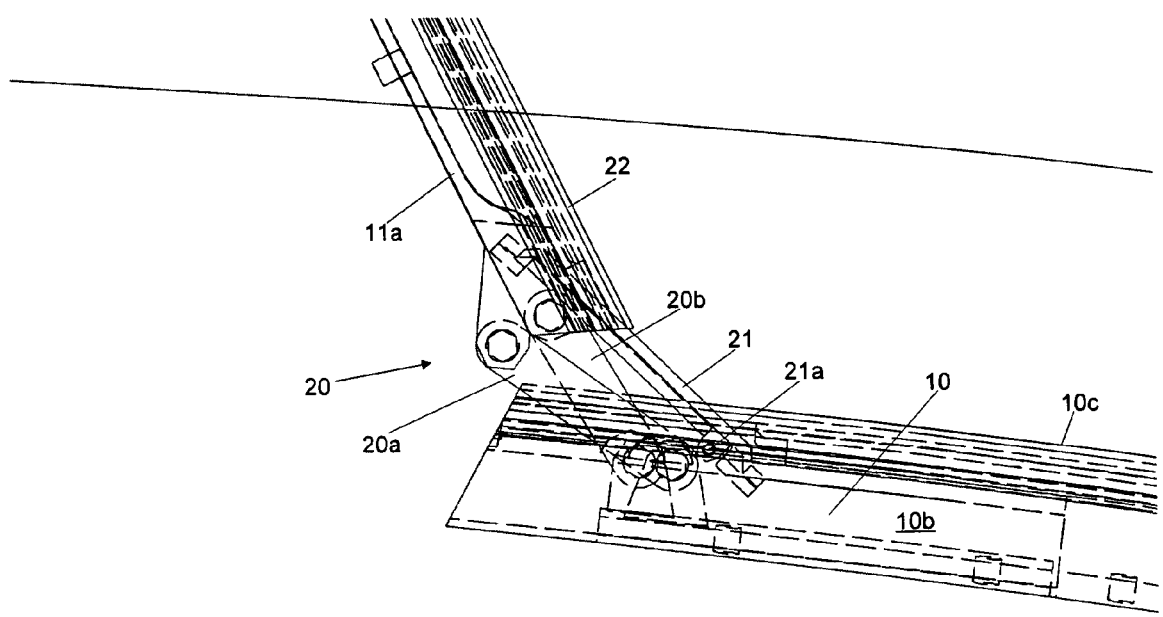
FIG. 16 shows the detail view from FIG. 15 in a partially open position.
Figure 17:
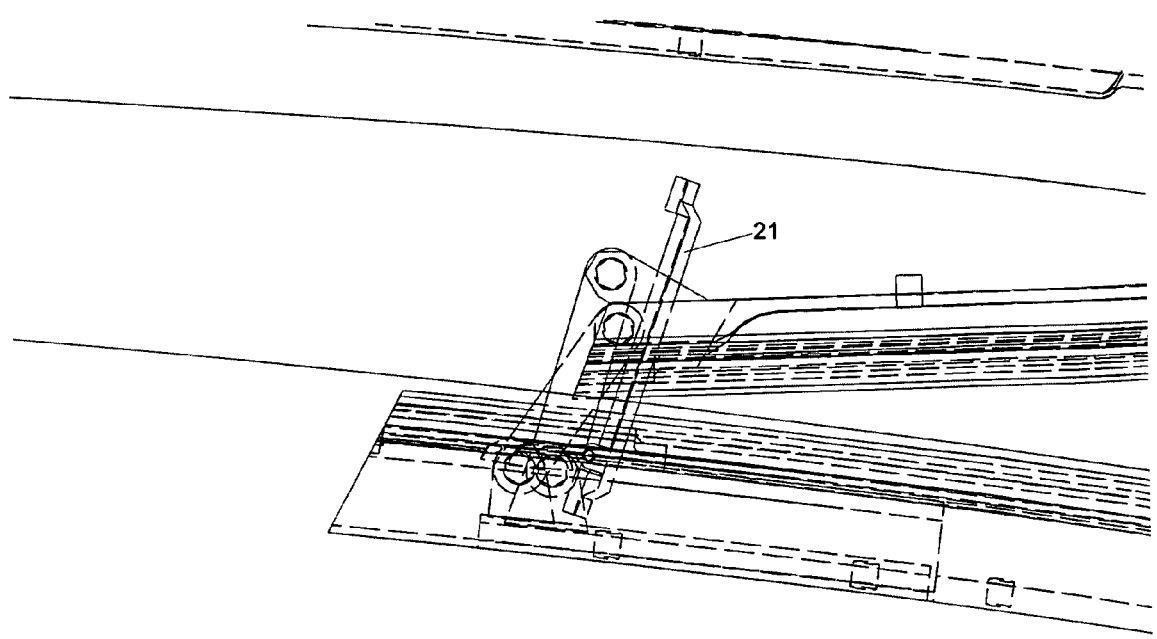
FIG. 17 shows the detail view from FIG. 15 in a completely open position with the outer link pivoted to the maximum.

In the case of a top according to the present invention from the first exemplary embodiment, the outer link 11*a*, as in particular FIG. 15 to FIG. 17 show, is not articulated on the middle roof part 10 via a conventional rotary joint. On the contrary, the articulation comprises a small four-bar linkage 20, the middle roof part 10 forming the base of the small four-bar linkage 20 and the outer link 11*a* forming the coupling member of the small four-bar linkage 20. A first connecting link 20*a* and a second connecting link 20*b* of the small four-bar linkage 20 cross over each other. A short covering plate 21 can be pivoted about its own articulation 21*a* essentially parallel to the connecting links 20*a*, 20*b* of the small four-bar linkage 20, the covering plate 21 being guided in a sliding manner in the region of its end which lies opposite its articulation 21*a*.

Overall, the articulation of the outer link 11*a* by means of a small four-bar linkage 20 means that the link mechanism 11, which connects the front roof part 1 to the middle roof part 10, is designed as a seven-bar linkage mechanism 11, the six links of which are formed by the middle link 10*a*, the connecting links 20*a* and 20*b* of the small four-bar linkage 20, the outer link 11*a*, the front roof part 1 and the front link 11*b*.

When a link is designed as the outer link, a series of particular features has to be taken into account. As also in the exemplary embodiment shown, an outer link 11*a* is advantageously arranged in a roof drip molding recess 10*b*, which is provided in any case in most modern vehicle tops. The roof drip molding recess 10*b* is covered outside the region of the link 10*a* by a roof drip molding cover 10*c*. The outer link 11*a* expediently comprises a corresponding link covering 22, which is placed onto the actual link, with the result that the link makes it possible for a roof drip molding 10*c*, 22 to appear continuous in the closed state of the top. However, a problem with an arrangement of this type is that, on account of its recessed accommodation in the roof drip molding recess 10*b*, the link 11*a* would strike against the roof drip molding covering 10*c* during a pivoting movement, at least if a large pivoting angle of the link 11*a* is required. However, the effect which can be achieved by the advantageous detail solution of the articulation of the link in the small four-bar linkage 20 is that the link 11*a* emerges over its entire length together with its roof drip molding covering 22 out of the roof drip molding recess 10*b* right at the beginning of its pivoting movement, thus making possible a particularly large pivoting angle. FIGS. 15 to 17 show that a free pivoting angle of the outer link of virtually 180 degrees is made possible in this manner.

The short covering plate 21 which can be pivoted at the same time by the four-bar linkage 20 is used, in the closed state of the top, merely to cover the roof drip molding region above the small four-bar linkage 20.

Figure 2:
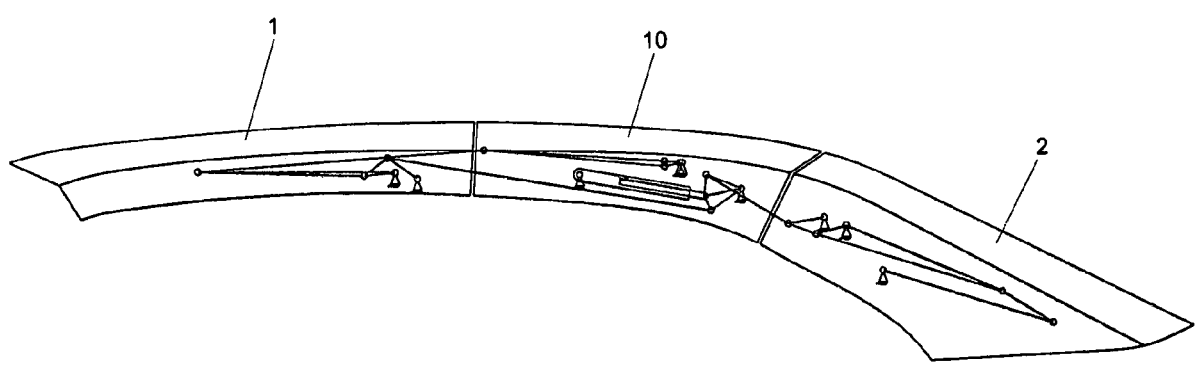
FIG. 2 shows the top from FIG. 1 in a schematic illustration clarifying the interaction of the components.
Figure 3:
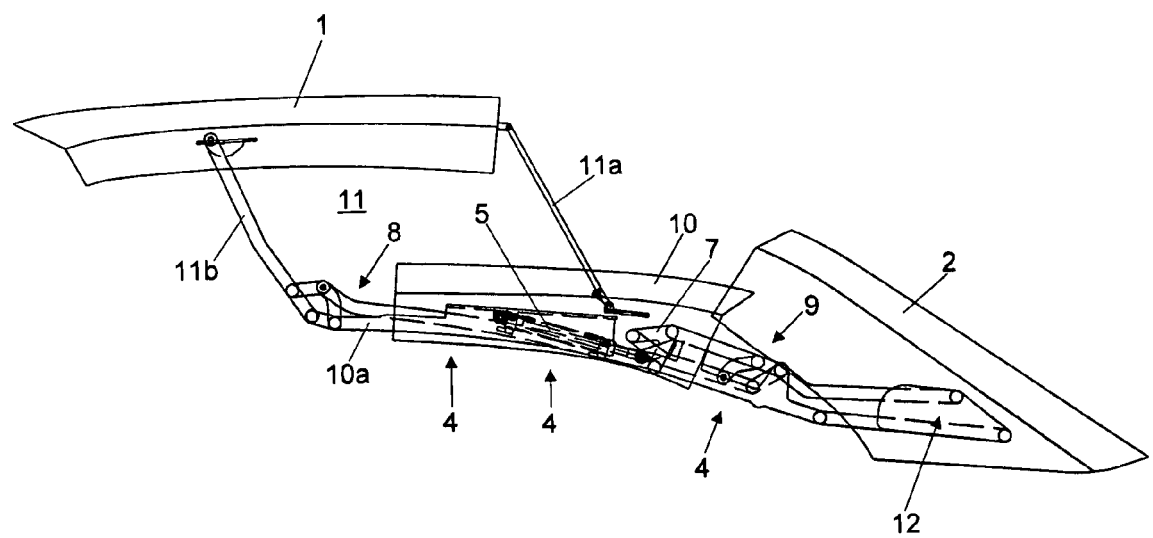
FIG. 3 shows a schematic partial view of the top from FIG. 1 from the side in a first step of an opening movement.
Figure 4:
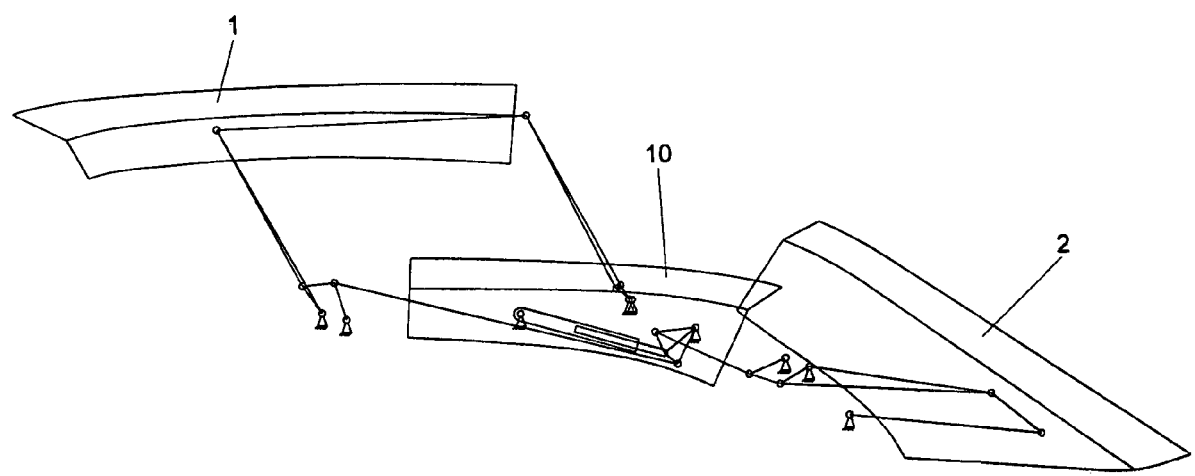
FIG. 4 shows the top from FIG. 3 in a schematic illustration clarifying the interaction of the components.
Figure 5:
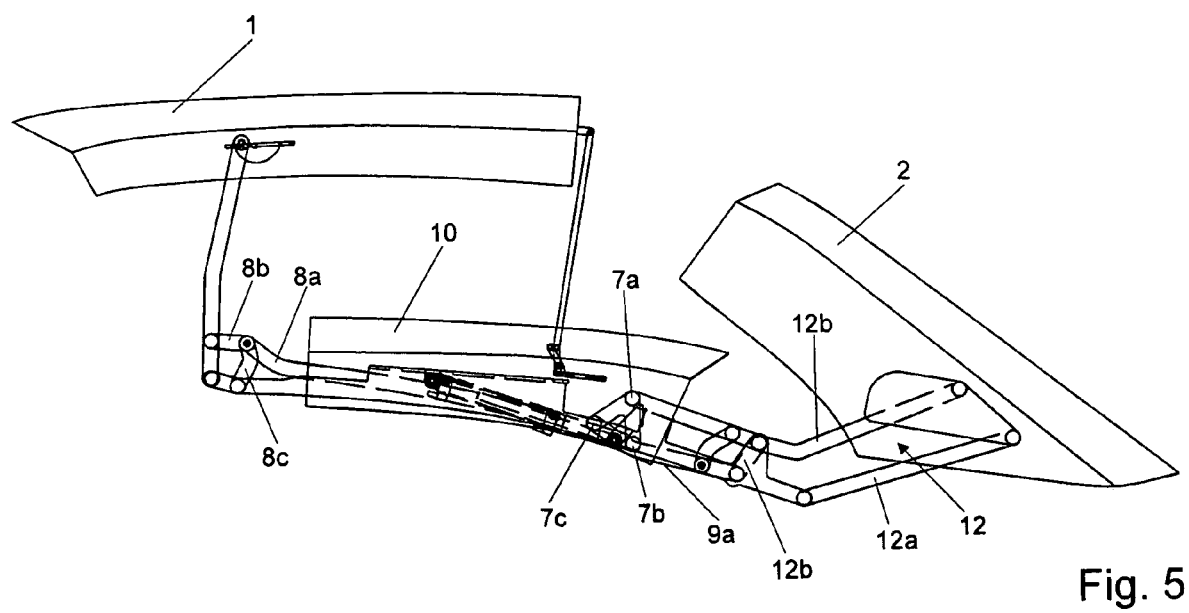
FIG. 5 shows a schematic partial view of the top from FIG. 1 from the side in a second step of an opening movement.
Figure 6:
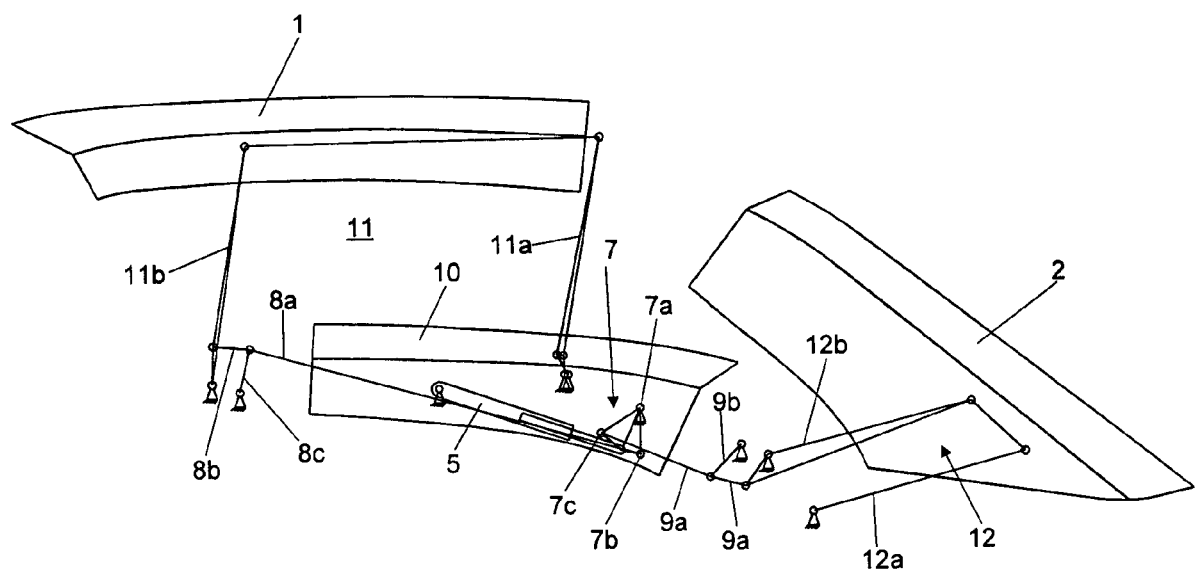
FIG. 6 shows the top from FIG. 5 in a schematic illustration clarifying the interaction of the components.
Figure 7:
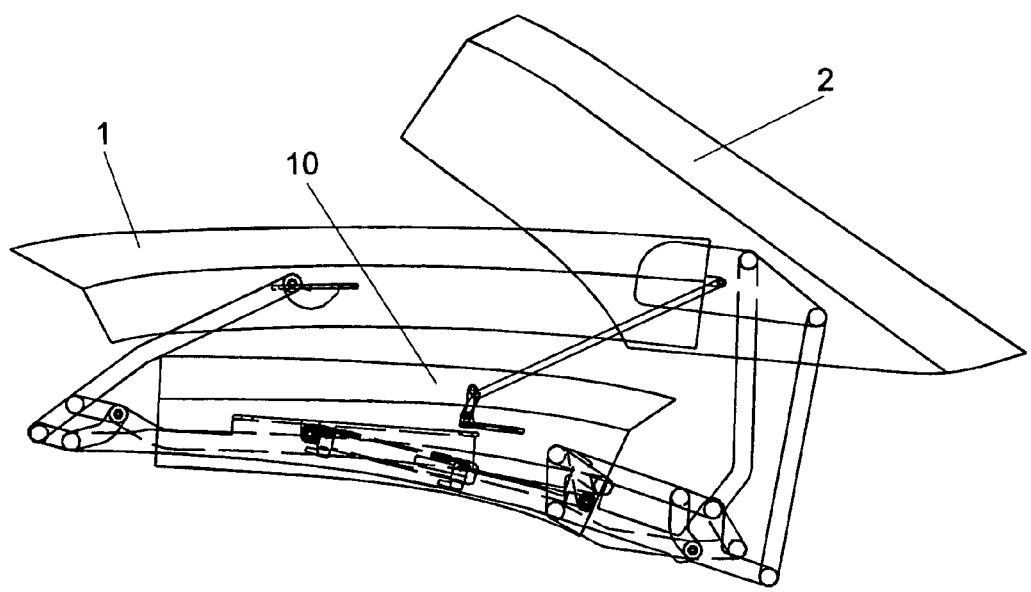
FIG. 7 shows a schematic partial view of the top from FIG. 1 from the side in a third step of an opening movement.
Figure 8:
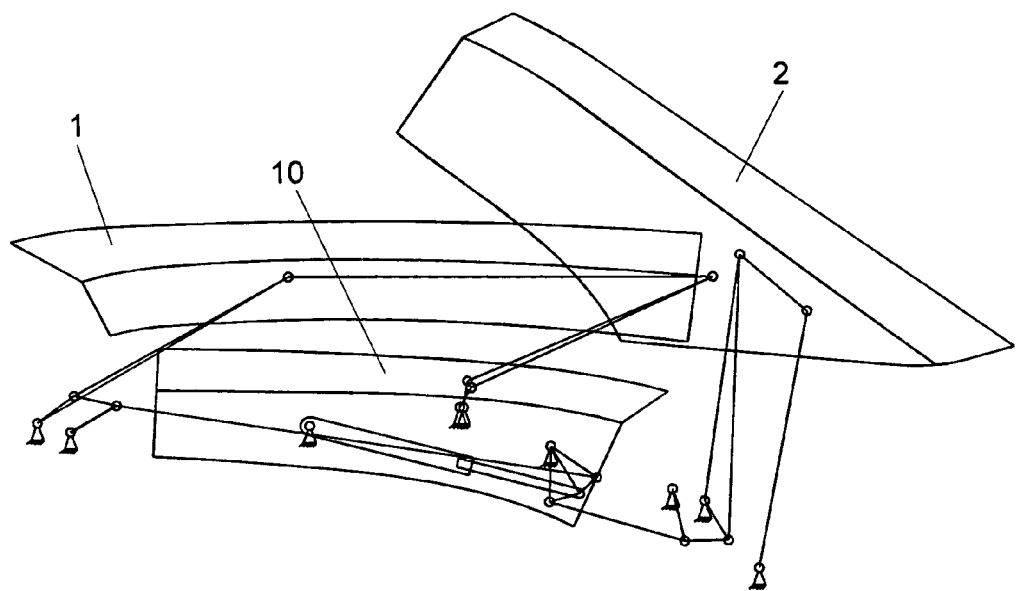
FIG. 8 shows the top from FIG. 7 in a schematic illustration clarifying the interaction of the components.
Figure 10:
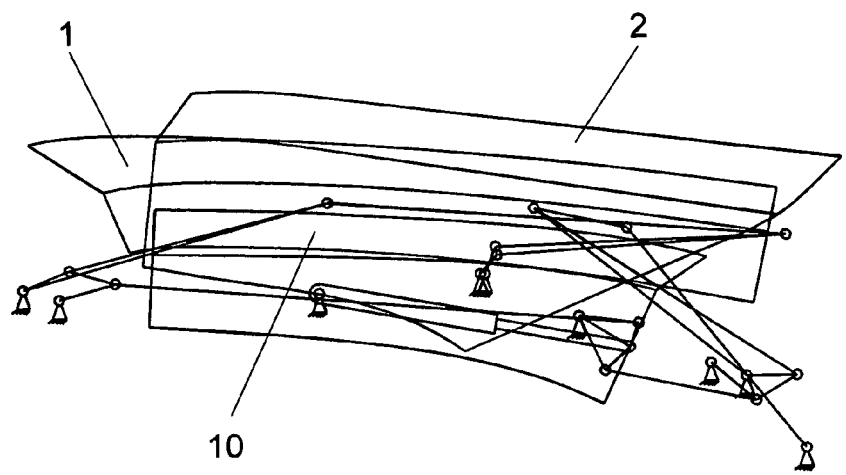
FIG. 10 shows the top from FIG. 9 in a schematic illustration clarifying the interaction of the components.
Figure 11:
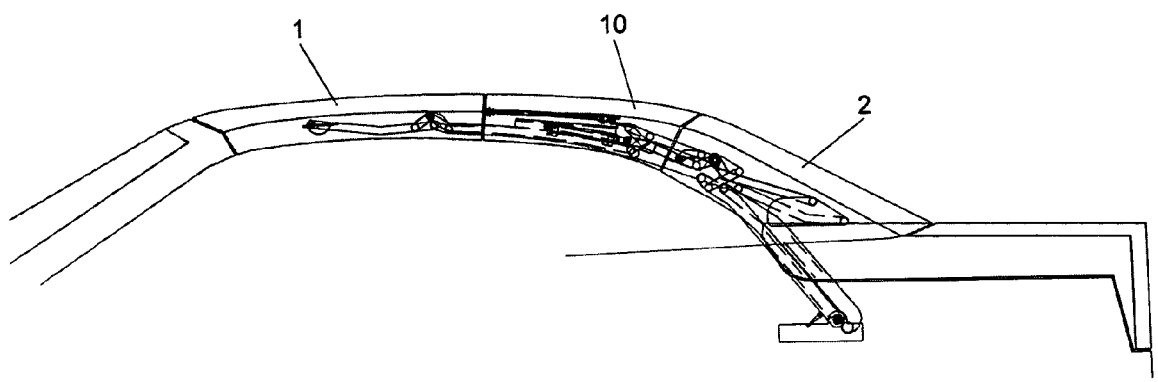
FIG. 11 shows a lateral overall view of the top from FIG. 1.

The top functions as follows:

Starting from the closed state of the top according to FIG. 1, FIG. 2 and FIG. 11, a first part of an opening movement of the top is firstly initiated. For this purpose, the force-introducing unit 5 is actuated, which causes the rotary link 7 to rotate anticlockwise according to the illustrations. From a comparison of FIG. 1 to FIG. 10, it is clear that in the process first of all the rotary link mainly actuates the first linkage 8 while the position of the third link 7*c* with respect to the second linkage 9 means that initially the second linkage 9 is scarcely actuated at all, in particular in the relevant longitudinal direction of the second, rear control link 9*a*.

Pivoting of the front roof part 1 over the middle roof part 10 therefore mainly takes place first of all. The pivoting of the front roof part 1 is predominant in the sequence of movement approximately as far as the position illustrated in FIG. 5 and FIG. 6. During the pivoting of the front roof part over the middle roof part, the outer link 11*a* undergoes a rotation through approximately 172 degrees.

The relative movement of the front roof part 1, which has already been substantially pivoted over the middle roof part 10, then slows down. At the same time, the movement of the rear roof part 2 increases, since now (approximately from the position shown in FIG. 5 and FIG. 6) a very direct conversion of the rotational movement of the rotary link 7 into a longitudinally directed movement of the rear control link 9*a* takes place. The described sequence of movement of the two roof parts can therefore be referred to as quasi-sequential.

Figure 9:
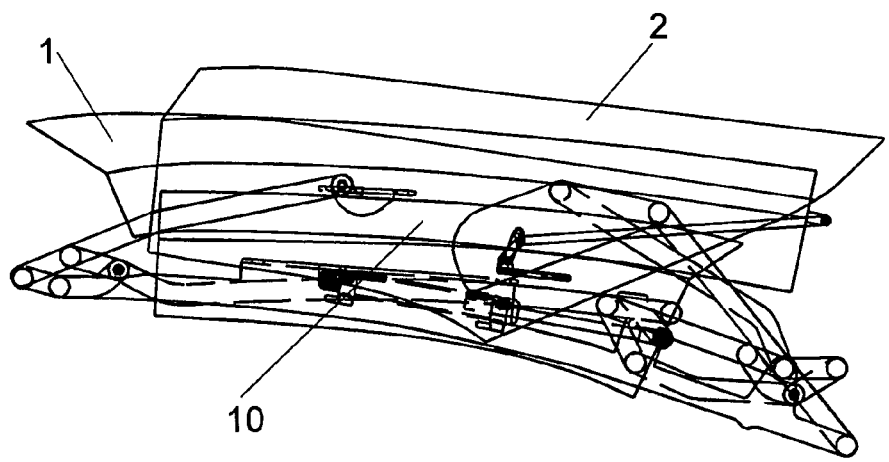
FIG. 9 shows a schematic partial view of the top from FIG. 1 from the side in a fourth step of an opening movement.
Figure 12:
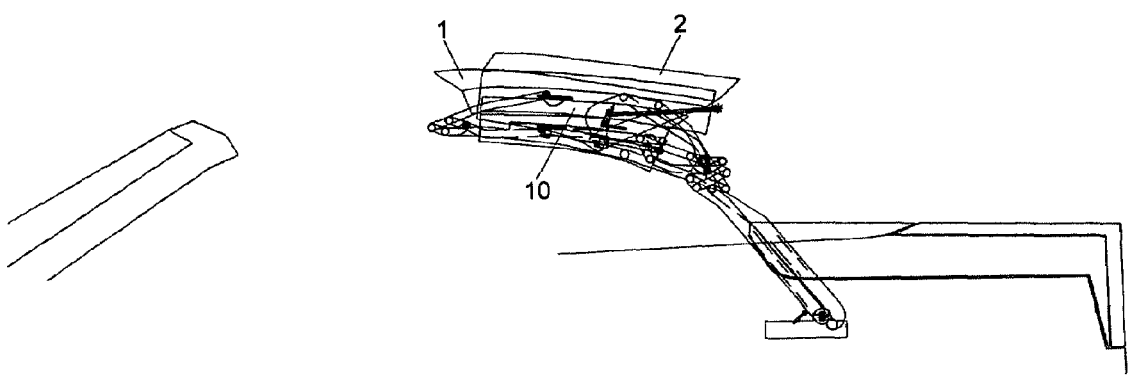
FIG. 12 shows a lateral overall view of the top from FIG. 9.

An end of the first part of the opening movement of the top is reached when the three roof parts 1, 2 and 10 have been fully arranged to form a stack (see FIG. 9, FIG. 10 and FIG. 12).

Figure 13:
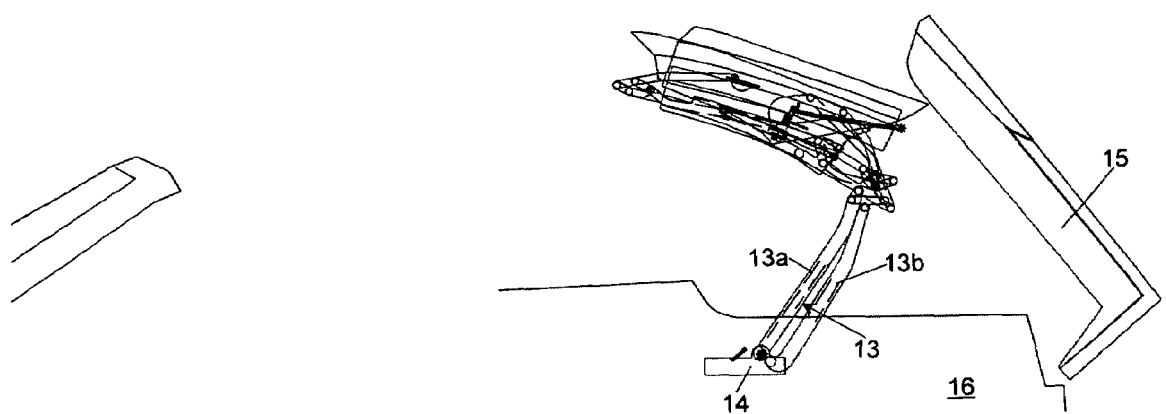
FIG. 13 shows the top from FIG. 12 in a further step of an opening movement.
Figure 14:
FIG. 14 shows the top from FIG. 12 in a state in which it is completely open and is deposited in a rear region of the vehicle.

A second part of the opening movement of the top is illustrated in the overall views of the top according to FIG. 12 to FIG. 14. The main four-bar linkage 13 is pivoted here in a manner driven by a second driving device to bring the previously formed package of the roof parts 1, 2, 10 into a storage region 16 at the rear of the vehicle. For this purpose, the rear element 15 is first of all pivoted up counter to the direction of travel and then pivoted shut again.

A second exemplary embodiment of a top according to the present invention will be described below in accordance with the drawings FIG. 18 to FIG. 28:

The top according to the second exemplary embodiment according to the present invention likewise comprises a front roof part 101, a middle roof part 110 and a rear roof part 102. This top is preferably connected in a manner identical to the first exemplary embodiment to the vehicle via a link mechanism (not illustrated) which is arranged between the middle roof part 110 and the vehicle bodywork. Similarly, the front roof part 101 can be moved over the middle roof part 110 and the rear roof part 102 can be moved over the front roof part 101 and over the middle roof part 110. The second preferred exemplary embodiment departs from the first one mainly in the structural and creative design of the outer link 111*a*.

The outer link 111*a* is connected, firstly, to the middle roof part 110 via a first link mechanism 140 designed as a four-bar linkage and, secondly, is connected to the front roof part 101 via a second link mechanism 120 designed as a four-bar linkage. Since the front roof part 101 is pivoted over the middle roof part 110, the second link mechanism 120 can be compared to an upper link mechanism, while the first link mechanism 140 corresponds to a lower link mechanism.

In this case, the one middle link 110a and a roof shell connected fixedly to the latter and incorporating the middle roof part 110 form a base of the first four-bar linkage 140. Said base is connected by means of two small connecting links 140a and 140b to an end region of the outer link 111a, which forms a connecting member of the first four-bar linkage 140.

At the same time, the outer link 111a forms, in its other end region which is at the front in the direction of travel, a base for the second four-bar linkage 120. The front roof part 101 forms a connecting member of the second four-bar linkage 120, the base and connecting member of the second four-bar linkage 120 being connected to each other by means of two small connecting links 120a, 120b.

The front roof part 101 is furthermore connected via a front link 111b to the middle link 110a by means of simple rotary joints in each case. All in all, the kinematics arranged on the supporting middle link 110a and belonging to the front roof part 101 therefore forms a positively controlled link mechanism 111 in the manner of a ten-bar linkage. The eight individual links of the given or positively controllable ten-bar linkage are: middle link 110a, first small connecting link 140a, second small connecting link 140b, outer link 111a, first small connecting link 120a, second small connecting link 120b, front roof part 101 and front link 111b.

In this case, by providing the first four-bar linkage 140 and the second four-bar linkage 120 with particularly small dimensions, a very stable chain of links is provided in spite of the relatively large number of links. For the reason mentioned, said chain of links essentially exhibits the stability of a large four-bar linkage comprising outer link 11a, front roof part 101, front link 111b and middle link 110a and middle roof part 110.

The connection of the outer link on both sides to the two roof parts adjacent to it enables a large pivoting angle of the outer link to be achieved both with respect to the front roof part and with respect to the rear roof part, as a result of which, in turn, particularly tight stacking of the roof parts, which are deposited one above the other in the same orientation, can be achieved in the open state of the top.

The outer link 111a particularly preferably rests on an essentially planar, outer surface of the roof parts in the closed state of the top. In particular, the outer link 111a forms a middle part of a longitudinal body formed as a trim strip. A front part 130 of the longitudinal body is connected fixedly to the front roof part 101 as part of it, and a rear part 131 of the longitudinal body is connected fixedly to the rear roof part 110 as part of it. FIG. 18 and FIG. 19 show the manner in which the parts of the trim-strip-like longitudinal body are arranged on the sheet-metal shaped parts forming the roof parts 101, 110. In this case, in the closed state of the top, an elastic intermediate layer 131a, which may consist, for example, of felt or cellular rubber, is provided between the outer link 111a and the shell of the middle roof part 110 and prevents the outer roof link from vibrating in the closed state of the top.

The longitudinal body comprising the outer roof link 111a can be manufactured, for example, from aluminum or stainless steel in order to bring about an appropriate visual decorative effect on the top. As an alternative, it may, however, also consist of steel painted in the color of the vehicle or coated in another way. For creative and aerodynamic purposes, the end regions of the longitudinal body preferably taper conically and are rounded. For the same reasons, the cross section of the longitudinal body or of the outer link 111a is essentially in the shape of a segment of a circle.

The respective small connecting links 140a, 140b, 120a, 120b of the first four-bar linkage 140 and of the second four-bar linkage 120 are essentially formed as disk bodies which are fitted into corresponding milled-out sections in the end regions of the mutually adjacent parts of the longitudinal body. The effect thereby achieved is that, in the closed state of the top, the small connecting links 140a, 140b, 120a, 120b each form part of the surface of the longitudinal body that is visible from the outside (see in particular FIG. 21 and FIG. 22) and the complex, multi-part construction of the longitudinal body is covered in a simple manner. The outwardly facing, visible end surfaces of the connecting links 120a, 120b, 140a, 140b have the same surface structure as the rest of the surface of the longitudinal body 130, 111a, 131 that can be seen from the outside. In addition, the end surfaces are matched by corresponding shaping to the generally curved shape of the surface of the longitudinal body; this is expressed in the sectional drawings according to FIG. 21, FIG. 22, FIG. 24, FIG. 25, FIG. 27 and FIG. 28 in each case by double lines at the corresponding end sides of the links.

All in all, the effect which can be achieved by the above-described integration of the outer link 111a in a decorative-strip-like longitudinal body which protrudes over the surface of the roof is that groove- or channel-like recesses in side regions of the roof parts for holding the outer roof link in the closed state of the top can be omitted. This makes it possible to achieve, in particular, a cost-reducing simplification of the production of the roof shells from sheet-metal shaped parts, since, if a receiving channel is provided for the roof link, the roof shells generally have to be produced by the welding together of a plurality of sheet-metal parts. In this case, the welding seam is generally situated in the bottom region of the groove-like recess.

A further advantage resulting from the simpler shaping of the roof shells which is therefore made possible is that the roof shells are sealed with respect to one another in a simpler and at the same time more effective manner, since no seals which are shaped in a complex manner and are matched to a groove-like channel are required.

Figure 20:
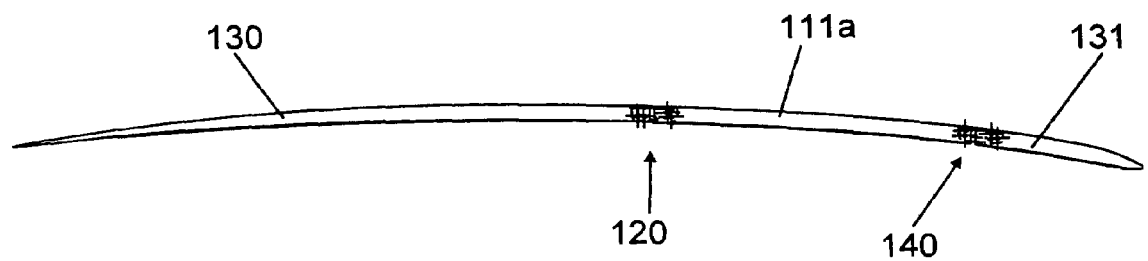
FIG. 20 shows a detail view of an outer roof link of the top from FIG. 18 in a closed state of the top.
Figure 21:
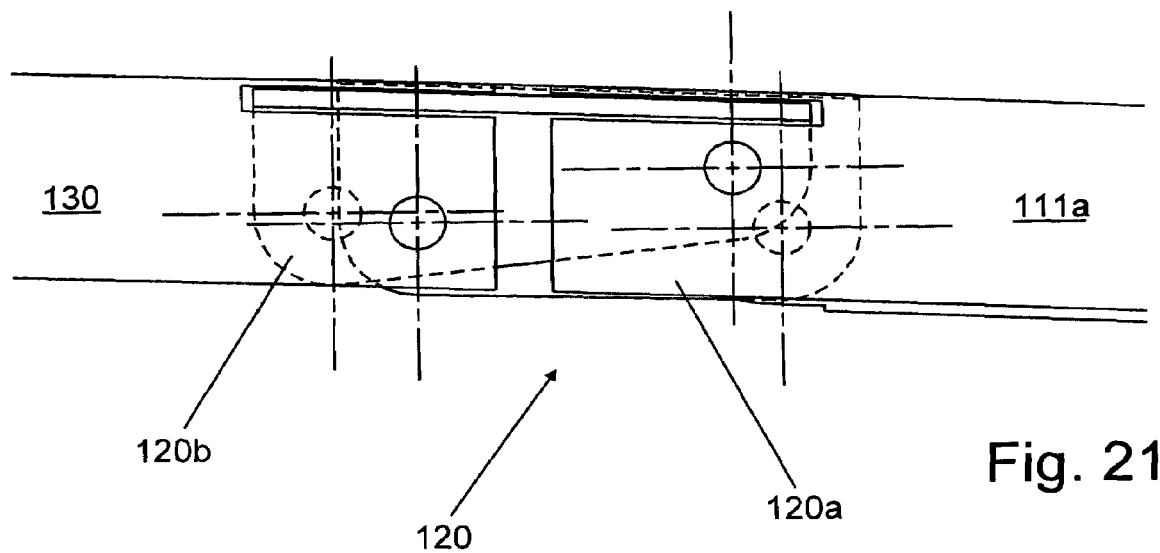
FIG. 21 shows a detail view of a front link mechanism for the articulation of the outer roof link from FIG. 20.
Figure 22:
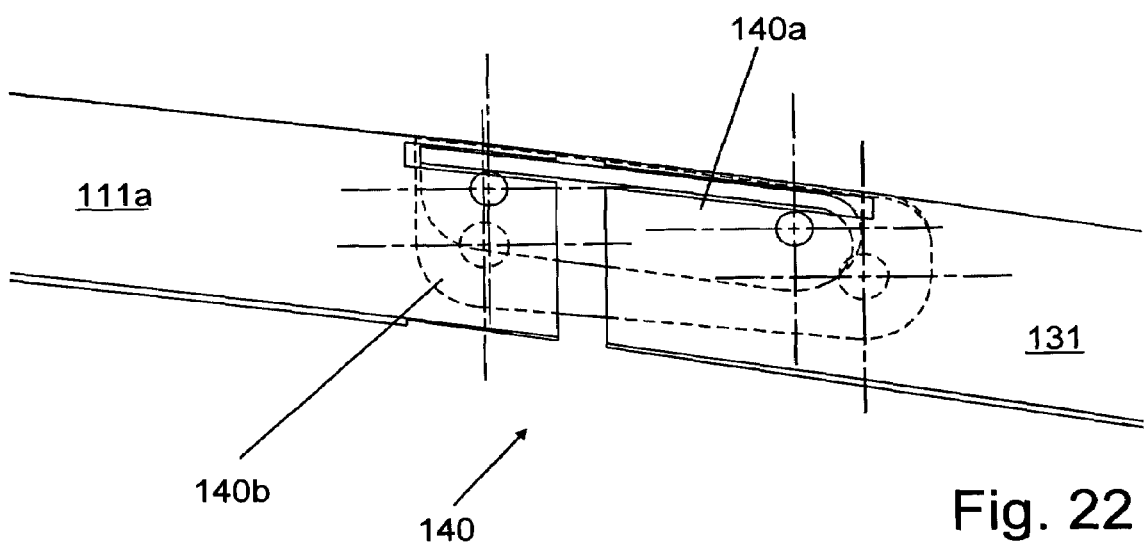
FIG. 22 shows a detail view of a rear link mechanism for the articulation of the outer roof link from FIG. 20.
Figure 23:
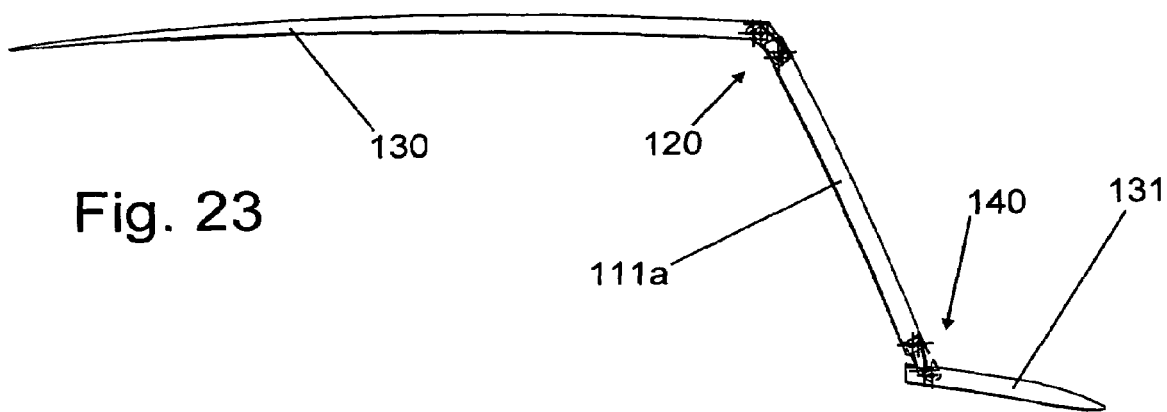
FIG. 23 shows a detail view of an outer roof link of the top from FIG. 18 in a partially open state of the top.
Figure 24:
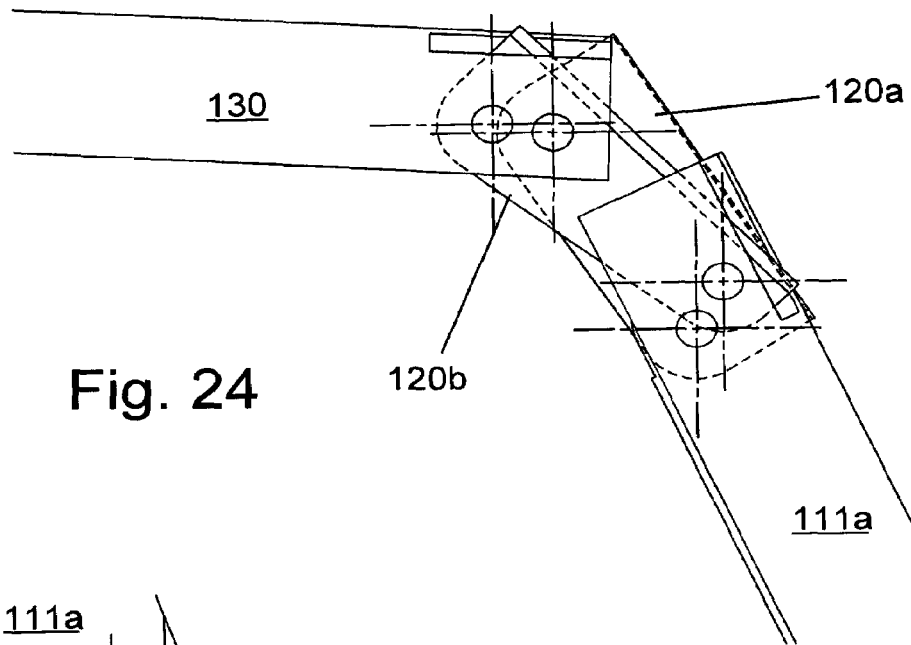
FIG. 24 shows a detail view of a front link mechanism of the outer roof link from FIG. 23.
Figure 25:
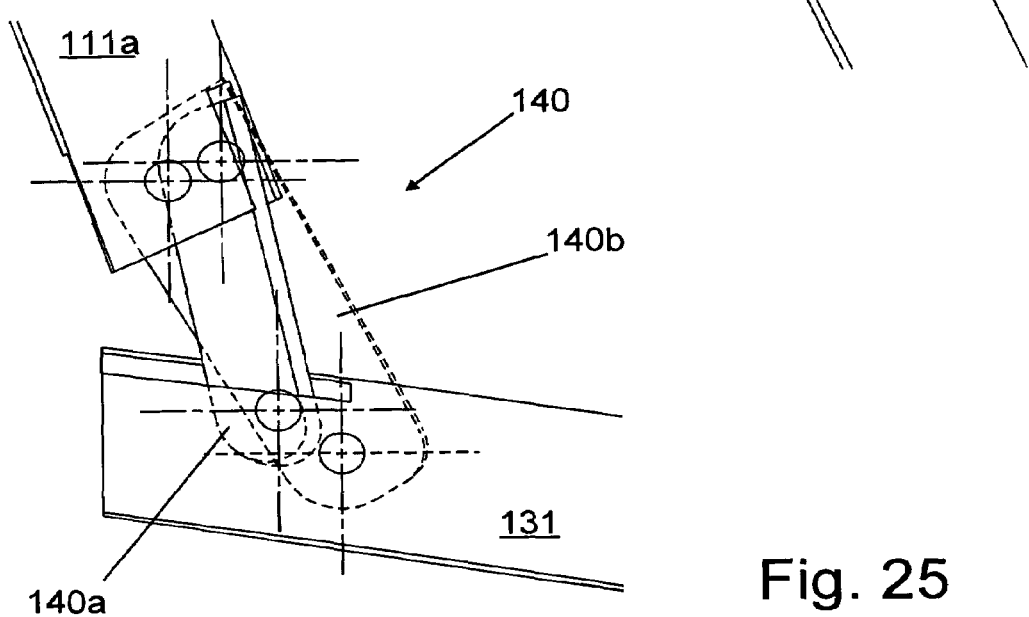
FIG. 25 shows a detail view of a rear link mechanism of the outer roof link from FIG. 23.
Figure 26:
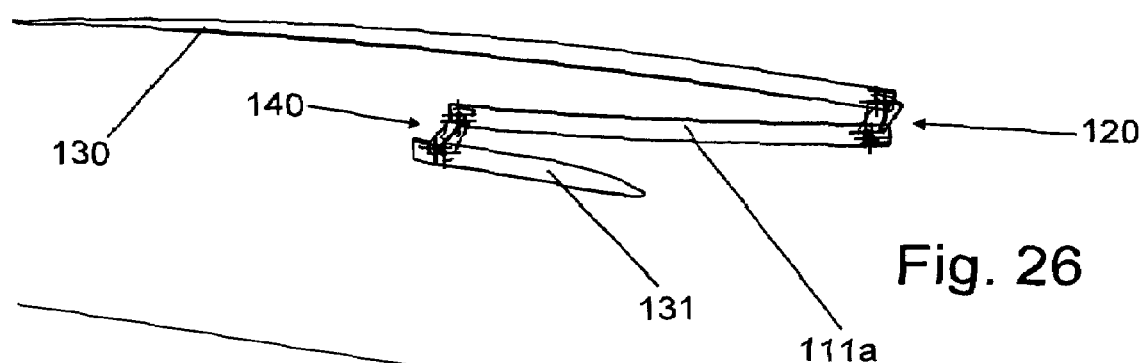
FIG. 26 shows a detail view of an outer roof link of the top from FIG. 18 in an open state of the top.
Figure 27:
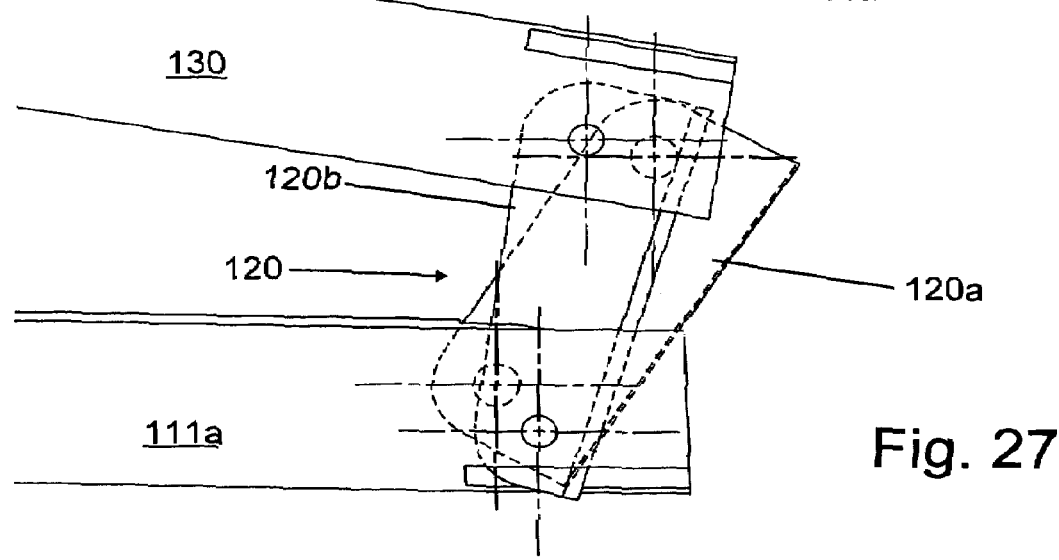
FIG. 27 shows a detail view of a front link mechanism of the outer roof link from FIG. 26.
Figure 28:
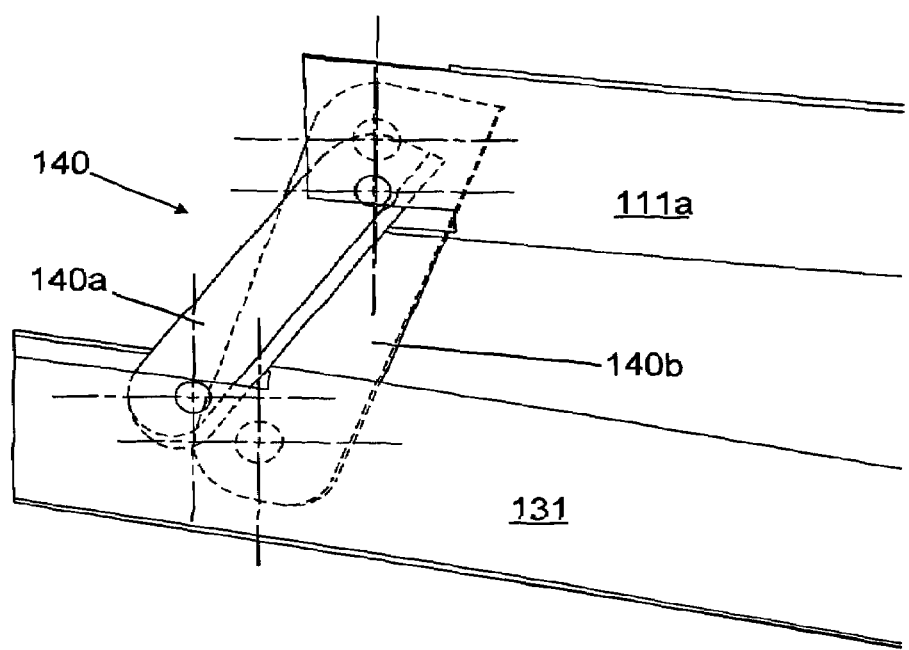
FIG. 28 shows a detail view of a rear link mechanism of the outer roof link from FIG. 26.

FIG. 20, FIG. 23 and FIG. 26 show detail views of the decorative-strip-like longitudinal body in various states of the top. A comparison of the open position of the top according to FIG. 26 with the closed position of the top according to FIG. 20 shows that the articulation of the outer link 111a on both sides by means of the four-bar linkages 140, 120 makes possible a particularly large pivoting angle of the parts 130, 131, 111a of the longitudinal body with respect to one another. It is also apparent from FIG. 26 that the pivoting angle of the front roof part 1 with respect to the outer link 1111a and the pivoting angle of the outer link 111a with respect to the middle roof part 110 can absolutely be greater than 180 degrees and, in the present exemplary embodiment, is restricted merely by the shape of the roof parts themselves and is in each case more than 160 degrees.

The opening movement of the top according to the second exemplary embodiment takes place analogously to the manner described in the first exemplary embodiment.

What is claimed is:

1. A convertible vehicle top, comprising:
   a first roof part having an outer side;
   a second roof part adjoining the first roof part in a closed position of the top;
   a first link mechanism; and
   an outer link pivotably connected to the first roof part by the first link mechanism and connected to the second roof part, wherein the outer link is disposed on the outer side of the first roof part in the closed position of the top.

2. The top as recited in claim 1, wherein the first link mechanism forms part of a four-bar linkage.

3. The top as recited in claim 2, wherein the first roof part forms a base of the four-bar linkage and wherein the outer link forms a connecting member of the four-bar linkage.

4. The top as recited in claim 3, wherein the first link mechanism includes a first connecting link and a second connecting link, the roof part and the outer link being connected via the first and connecting links.

5. The top as recited in claim 1, further comprising a second link mechanism and wherein the outer link is connected to the second roof part by the second link mechanism.

6. The top as recited in claim 5, wherein the second link mechanism is part of a four-bar linkage.

7. The top as recited in 1, wherein the outer link forms part of a longitudinal body, the longitudinal body protruding over the outer surface of the top in the closed position of the top.

8. The top as recited in claim 1, wherein the outer link rests on the outer side of the top in the manner of a trim strip in the closed position of the top.

9. The top as recited in claim 1, wherein at least one of the first roof part and the second roof part is a single-piece part.

10. The top as recited in claim 1, wherein said first link mechanism includes at least one connecting link, said at least one connecting link extending as an axial prolongation of said outer link in the closed position of the top.

11. The top as recited in claim 1, wherein the first roof part includes a groove-shaped recess, the outer link being arranged in the recess in the closed position of the top.

12. The top as recited in claim 4, further comprising a covering plate including a joint, said covering plate being pivotable to a position essentially parallel to the first and second connecting links.

13. The top as recited in claim 1, wherein the second roof part is pivotable to a position over the first roof part and parallel to the first roof part.

14. The top as recited in claim 1, wherein the outer link is pivotable through an angle of at least 150 degrees.

15. The top as recited in claim 1, wherein the outer link is pivotable through an angle of at least 160 degrees.

16. The top as recited in claim 1, wherein the first roof part is a middle roof part and the second roof part is a front roof part and further comprising a third roof part disposed arranged behind the first roof part in a direction of travel of the vehicle.

17. The top as recited in claim 1, wherein the top is a three-part top.

18. The top as recited in claim 16, wherein, the second roof part is moveable over the first roof part and the third roof part is moveable over the first roof part and over the second roof part during an opening movement of the top.

19. A convertible vehicle top, comprising:
    a first roof part;
    a second roof part adjoining the first roof part in a closed position of the top;
    an upper link mechanism; and
    a link pivotably connected to the first roof part by a hinge being directly provided at the first roof part, and wherein the upper link mechanism is disposed between the link and the second roof part so as to connect the link to the second roof part, wherein said first roof part is a middle roof part of the convertible vehicle top and the second roof part is a front roof part of the convertible vehicle top.

20. A convertible vehicle top, comprising:
    a first roof part;
    a second roof part adjoining the first roof part in a closed position of the top;
    an upper link mechanism; and
    a link pivotably connected to the first roof part by a hinge being directly provided at the first roof part, and wherein the upper link mechanism is disposed between the link and the second roof part so as to connect the link to the second roof part, wherein said upper link mechanism forms part of a four-bar linkage including a first connecting link and a second connecting link, said first connecting link and said second connecting link being each pivotably connected to said second roof part and to said link.

21. A convertible vehicle top, comprising:
    a first roof part;
    a second roof part adjoining the first roof part in a closed position of the top;
    an upper link mechanism; and
    a link pivotably connected to the first roof part, and wherein the upper link mechanism is disposed between the link and the second roof part so as to connect the link to the second roof part, wherein said link is coupled to said first roof part by a lower link mechanism, and wherein said lower link mechanism forms part of a four-bar linkage comprising a first connecting link and a second connecting link, said first connecting link and said second connecting link being each pivotably connected to the first roof part and to said link.

22. The top as recited in claim 21, further comprising a covering member assigned to said lower link mechanism and at least partially covering the first connecting link and the second connecting link in a closed position of the top.

23. The top as recited in claim 22, wherein said covering member is pivotably attached to said first roof part, and wherein an opening movement of said lower four-bar linkage urges said covering plate to pivot to an uncovering position.

24. A convertible vehicle top, comprising:
    a first roof part;
    a second roof part adjoining the first roof part in a closed position of the top;
    an upper link mechanism; and
    a link pivotably connected to the first roof part, and wherein the upper link mechanism is disposed between the link and the second roof part so as to connect the link to the second roof part, wherein said link is disposed on an exterior side of the first roof part in the closed position of the top.

25. A convertible vehicle top, comprising:
    a first roof part having an outer side;
    a second roof part having an outer side and adjoining the first roof part in a closed position of the top;
    an outer link pivotably connected to the first roof part and to the second roof part;

a link mechanism disposed on the outer side of at least one of said first roof part and said second roof part by the link mechanism; and a covering member disposed on at least one of said first roof part and said second roof part and at least partially covering said link mechanism in the closed position of the top.

26. The top as recited in claim 25, wherein said covering member is attached to at least one of said first roof part and said second roof part by a joint and is pivotable around said joint by said link mechanism, said link mechanism abutting against said covering member in an opened position of the top.

27. The top as recited in claim 26, wherein the joint defines a joint axis parallel to at least one articulation axis of the link mechanism.

28. The top as recited in claim 25, wherein said covering member includes a spring member urging the covering member into a covering position.

29. The top as recited in claim 25, wherein the link mechanism forms part of a four-bar linkage including a first connecting link and a second connecting link, said first connecting link and said second connecting link being each pivotably connected to said link and to at least one of said first roof part and said second roof part.

30. The top as recited in claim 25, wherein the covering member includes a covering surface arranged in parallel to a surface of at least one of said first roof part and said second roof part.

31. The top as recited in claim 30, wherein said covering member includes an extension disposed perpendicular to the covering surface, wherein said covering member is attached to at least one of said first roof part and said second roof part by a joint provided in said extension, the covering member being pivotable around said joint by said link mechanism and said link mechanism abutting against said covering member in an open position of the top.

32. The top as recited in claim 25, wherein said outer link includes an external surface and said covering member includes a covering surface, and wherein, in a closed position of the top, the external surface is arranged flush with at least one of said fist roof part and said second roof part in a manner of a trim strip, the covering surface arranged flush with at least one of said first roof part and said second roof part, and said covering member axially adjoins said external surface.

* * * * *